S. ORZCHOVSKI.
CREAM WHIP.
APPLICATION FILED JAN. 6, 1921.
1,438,716.
Patented Dec. 12, 1922.
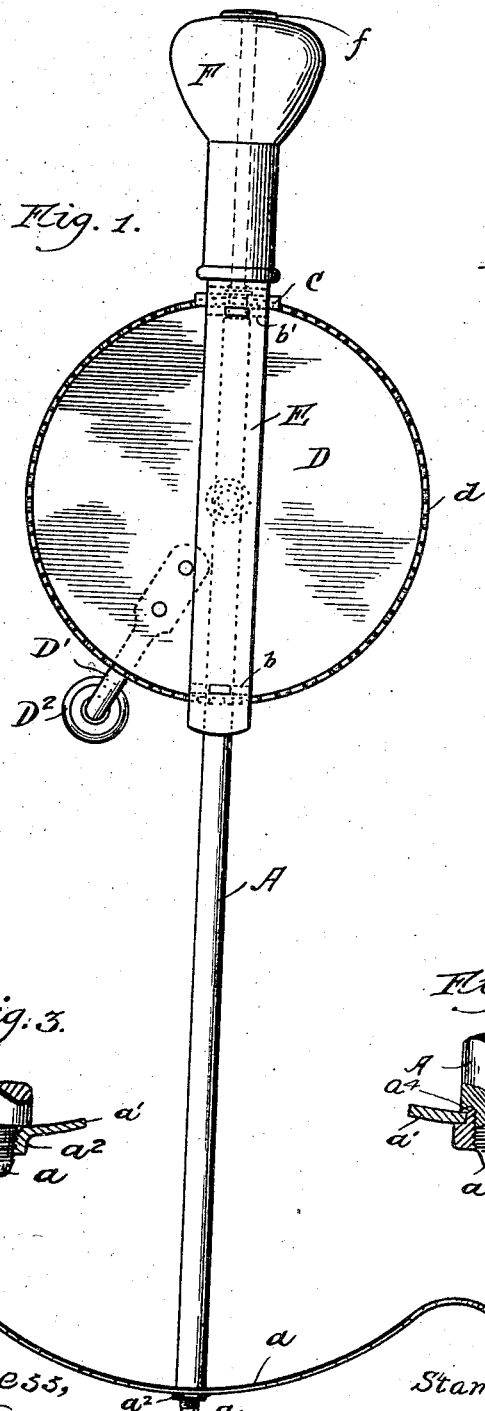
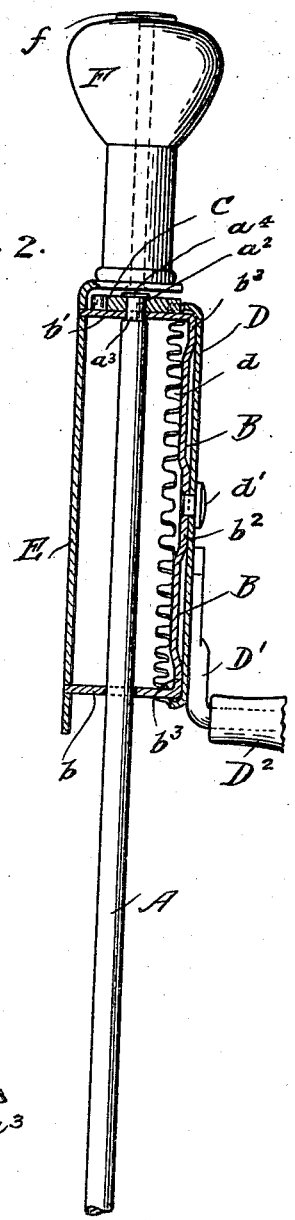
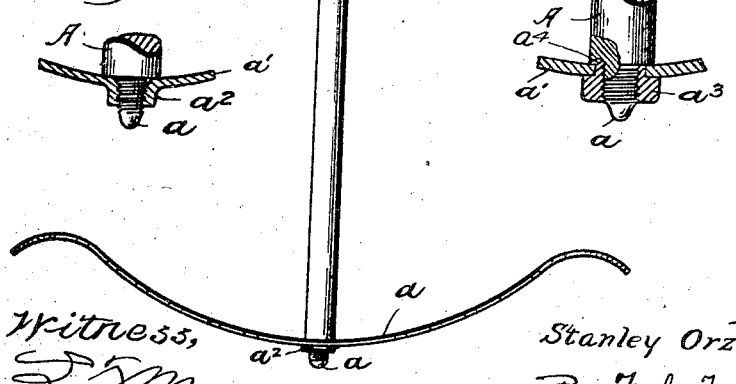
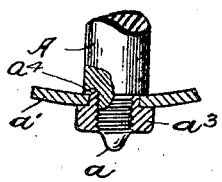
Inventor,
Stanley Orzchovski
By Fisher, Jowb, Clapp & Soans.
Attys.
Witness, Patented Dec. 12, 1922.

1,438,716

UNITED STATES PATENT OFFICE.

STANLEY ORZCHOVSKI, OF DE KALB, ILLINOIS, ASSIGNOR TO KOHLER DIE & SPECIALTY COMPANY, OF DE KALB, ILLINOIS, A CORPORATION.

CREAM WHIP.

Application filed January 6, 1921. Serial No. 435,313.

*To all whom it may concern:*

Be it known that I, STANLEY ORZCHOVSKI, a resident of De Kalb, in the county of De Kalb and State of Illinois, have invented certain new and useful Improvements in Cream Whips, of which I do declare the following to be a full, clear, and exact description, reference being had to the accompanying drawing, forming a part of this specification.

The present invention has relation to that class of devices commonly used for whipping cream, beating eggs, or the like, and the object of the invention is to produce an extremely simple, cheap and effective cream whip or beater. To this end, the invention consists in the features of novelty hereinafter described, illustrated in the accompanying drawing and particularly pointed out in the claims at the end of this specification.

In the drawing, Figure 1 is a view in side elevation of the whip or beater embodying my invention. Figure 2 is a view in central vertical section through the gearing by which the beater shaft is revolved, parts being shown in elevation. Figure 3 is an enlarged detail view, partly in section, at the lower end of the shaft. Figure 4 is a view similar to Fig. 3 but showing a modification.

In the accompanying drawing, A designates the beater shaft that is provided at its lower end with a suitable beater blade $a'$ consisting preferably of a plate of sheet metal, curved upwardly and outwardly and provided with perforations. The lower end of the beater shaft A is formed with a reduced portion $a$ that passes through the beater blade $a'$ and is adapted to set within a socket in the bowl containing the material to be whipped or beaten. As shown, this reduced portion $a$ of the shaft A is screw-threaded (see Figs. 1 and 3) and engages corresponding threads in the hub $a^2$ of the blade $a'$. This hub $a^2$ in the preferred embodiment of the invention is formed by stamping or offsetting the hub from the body of the blade $a'$. In the modification of the invention shown in Fig. 4 of the drawing, the hub, there designated as $a^3$, is formed as a separate part having a reduced upper portion that is passed through the hole in the blade $a'$ and then the top of this reduced portion is swaged or riveted over onto the blade in the form of an annular bead, as shown at $a^4$, to hold the part $a^3$ in secure engagement with the blade, and the lower end of the stem A around the threaded extension $a$ is formed with an annular cupped seat to receive the bead $a^4$ when the nut $a^3$ is engaged on the end of the stem A. The part $a^3$ is threaded upon its interior to engage the threads of the reduced portion $a$ of the shaft A.

It will be understood, of course, that the screw threads above described will be cut in such direction as to avoid the working of the blade from off the end of the shaft when the latter is revolved. By making the blade $a$ conveniently removable from the shaft A as above described, the blade can be readily disengaged from the shaft and can then be packed along side the shaft, thereby enabling the parts to be inclosed in a very small package.

Upon the upper portion of the shaft A is mounted a frame B having lower and upper inwardly turned arms $b$ and $b'$. The lower arm $b$ is formed with a hole through which passes the shaft A and the upper arm $b'$ is formed with a similar but smaller hole through which passes the reduced portion $a^2$ of the shaft A. The upper arm $b'$ rests upon the shoulder $a^3$ at the base of the reduced end portion $a^2$ of the shaft A. On the top of the upper arm $b'$ and encircling the reduced portion $a^2$ of the shaft A is revolubly mounted a pinion C that is keyed or fixed on the reduced portion $a^2$ of the shaft and is held against displacement by upsetting or spreading, as at $a^4$, the extreme upper end of the shaft A. The teeth of the pinion C engage with the teeth $d$ of the crown gear wheel D that is pivoted upon a headed stud $d'$ that projects outwardly from the frame B. The gear wheel D is preferably stamped from sheet metal and this wheel D has fixed thereto an arm $D'$ the upwardly bent end of which has mounted thereon a handle $D^2$ whereby the wheel D will be turned when revolution is to be imparted to the shaft A. That portion of the frame B to which the stud $d'$ is fixed is offset outwardly as at $b^2$ and similarly, the upper and lower end portions of the frame are offset as at $b^3$, the purpose of thus offsetting portions of the frame B being to lessen the friction between the frame and the gear wheel D. The upper and lower ends of the frame closely approximate the inner faces of the gear wheel D and thus aid in holding the wheel in proper working position.

To the ends of the lower and upper ends $b$ and $b'$ of the frame B is fixed a bar E that is perforated to receive the reduced extreme end portions of the arms $b$ and $b'$ which, after being passed through the holes in the bar D are upset to securely hold the bar in place. The upper end of the bar E is bent over the pinion C and over the extreme upper end of the shaft A and serves to better guard the pinion against displacement. Upon the top of the bent upper end of the bar E is mounted a handle F consisting preferably of wood, through which passes a headed pin $f$, the lower end of which passes through a hole in the bent upper end of the bar E and is secured thereto.

From the foregoing description, the operation of my improved whip or beater will be readily understood by those familiar with this class of devices. The operator will grasp the handle F with one hand and with the other hand will grasp the handle $D^2$ and by turning the gear wheel D will impart rapid revolution to the shaft A and the beater blade $a'$ at the lower end thereof.

My improved beater is extremely simple and comprises few parts, which can be easily and cheaply assembled. By locating the handle as shown, all danger of the fingers of the operator being caught in the gears is avoided and by the location and arrangement of the gears, all danger of the gears getting out of mesh or the pinion C becoming displaced is avoided.

Having thus described my invention, what I claim as new and desire to secure by Letters Patent is:—

1. An article of the character described, comprising a revoluble beater shaft having a shouldered upper end, a frame mounted upon said shaft and having upper and lower arms through which said shaft passes, the upper arm of said frame resting upon the shoulder adjacent the top of the shaft, a pinion fixed to the upper end of the shaft above the upper arm of said frame, a gear wheel pivotally mounted upon said frame and engaging said pinion, and a separate member secured to the ends of the aforesaid arms and having the upper end bent over the pinion and carrying a handle thereon in alignment with said shaft.

2. An article of the character described, the combination of a frame comprising an elongated plate having the upper and lower ends bent laterally on lines at right angles to the length of the plate and each provided with a perforation, a beater shaft having one end journaled in the perforations of said ends, a bar fixed to the upper and lower ends of said frame and having its upper end bent over and spaced from the upper bent end of the frame to afford a gear chamber therebetween, a handle mounted on the upper end of the bar, a pinion in the gear chamber and fixed to the upper end of the beater shaft, and a wheel pivotally mounted upon said frame and having teeth engaging said pinion, said gear wheel being provided with a handle whereby it may be turned.

3. An article of the character described, comprising a revoluble beater shaft, a frame wherein the upper end of said shaft is revolubly mounted, said frame having upper and lower bent ends through which said shaft passes and having a central offset portion with a laterally projecting stud having a crown wheel pivotally mounted thereon, said frame having offset portions at the end engaging the inner surface of the crown wheel adjacent the periphery thereof, a pinion fixed to the upper end of said beater shaft above the bent upper end of said frame and meshing with the crown wheel, and a separate bar fixed to the upper and lower ends of said frame and having a bent upper end provided with a handle.

4. An article of the character described, comprising a revoluble beater shaft having a reduced lower end forming a shoulder, a perforated blade having an aperture through which the reduced lower end of the shaft is inserted, and means having a threaded engagement with said reduced lower end for clamping the plate against the shoulder.

5. An article of the character described, comprising a revoluble beater shaft having a reduced threaded lower end, and a beater blade provided with an integral offset perforated portion interiorly threaded to engage the reduced threaded end of the shaft.

6. In a device of the class described, the combination of a yoke having a shaft journaled in the arms thereof, a bar riveted to the outer extremities of the arms of the yoke and forming with the yoke an elongated rectangular frame, a pinion on the end of the shaft, a gear wheel on the yoke meshing with the pinion, an extension on said bar bent over the end of the rectangular frame and affording a chamber therebetween for the pinion, a handle mounted on said extension in alignment with the shaft, and a beater on the outer end of the shaft.

STANLEY ORZCHOVSKI.